May 31, 1955  I. A. GETTING ET AL  2,709,773

REMOTE CONTROL SYSTEM WITH POSITION INDICATING MEANS

Filed Oct. 19, 1945

*INVENTORS*
IVAN A. GETTING
LEE L. DAVENPORT
BY

*ATTORNEY*

United States Patent Office 2,709,773
Patented May 31, 1955

2,709,773

REMOTE CONTROL SYSTEM WITH POSITION INDICATING MEANS

Ivan A. Getting, Belmont, and Lee L. Davenport, Cambridge, Mass., assignors, by mesne assignments, to the United States of America as represented by the Secretary of War Application October 19, 1945, Serial No. 623,405

5 Claims. (Cl. 318—16)

This invention relates to electrical circuits, and more particularly to electrical circuits adapted for remote control of distant objects, such as aircraft, by the reception of electrical signals transmitted from one place to another, such as those transmitted by electromagnetic radiation.

It is sometimes desirable to direct the flight of aircraft from a ground station, without the necessity of carrying personnel in the aircraft, thus providing means for directing and controlling the aircraft, without any of the dangers to personnel involved in its flight. It is particularly desirable to couple such direction with a radar (radio echo detection and ranging) set which permits observation of the location and flight of the aircraft without the necessity of visual observation.

Therefore, among the objects of this invention are to provide means for utilizing a radar set to transmit information to an aircraft as well as simultaneously to indicate the position thereof; to utilize a coding system in the transmission of said energy to prevent accidental control of the aircraft by other means than the signals transmitted from the radar set; to provide means for the remote control of an aircraft or other equipment, particularly mobile equipment, and to provide a control circuit which may be actuated by signals transmitted from a distant place.

Further objects, advantages, and novel features of the invention will become apparent from the description herein, wherein reference is made to the drawings in which.

Figure 1:
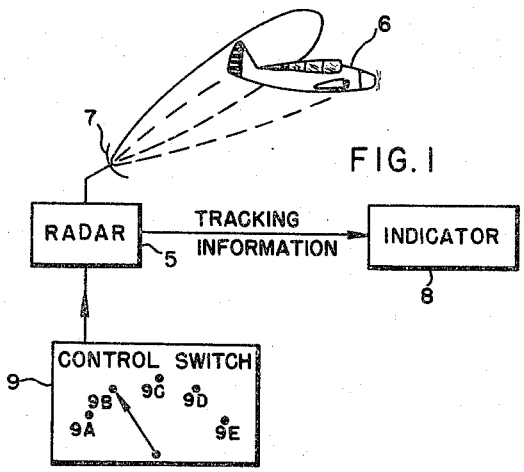
Fig. 1 is a composite diagram indicating the manner in which control is accomplished at the ground station.

Referring now to Fig. 1, there is illustrated diagrammatically a radar set 5 which is preferably of the type which will automatically track a target such as an aircraft 6. It is contemplated that the type of radar set used shall be of the kind described in the copending application of Louis N. Ridenour, Serial No. 516,299, filed December 30, 1943, now Patent No. 2,473,175, although other types could easily be utilized. In the operation of set 5, pulses of electromagnetic energy are radiated from antenna 7, which directs the energy in a comparatively narrow beam which may be conically scanning in space as explained and typified in the above mentioned application. Echoes are reflected, or signals returned, from objects in the path of the impinging beam, such as from aircraft 6, and transmitted to the radar antenna 7, which may be used for reception after the transmission of each pulse of energy. Although it is contemplated that radar set 5 track target 6 automatically by means such as suggested in the said copending application of Louis N. Ridenour, targets 6 may be followed by manual adjustment of directive antenna 7, or in other ways. In any event the tracking information, or course of aircraft 6 may be viewed or indicated on an indicator 8.

In most radar sets the mode of operation includes the transmission of discrete pulses of radio frequency energy repeated at a known pulse repetition frequency. Knowing the velocity of the transmission of the energy into space, circuits may be utilized which measure and provide an indication of the time required for a pulse to be transmitted and returned from a target such as 6, taking due account of any equipment delay or other constant time delay. Hence the range as well as direction of the target from radar set such as 5 is thereby determined and indicated. The pulse repetition frequency may be controlled within wide limits when suitable timing circuits are employed, and it is contemplated herein that radar set 5 will utilize different pulse repetition frequencies, to each of which aircraft or target 6 will respond in an appropriate manner, as will appear more fully hereinafter. Therefore radar set 5 may be provided with a control switch 9 having contacts or positions 9A, 9B, 9C, 9D and 9E. At each position of switch 9 radar set 5 operates at a different pulse repetition frequency which, for example, may be chosen respectively to be 731 P. P. S. (pulses per second), 1024 P. P. S., 1118 P. P. S., 2002 P. P. S., and 2180 P. P. S., which are illustrative only. Other types of intelligence transmission by the radar set using different types of signal modulation, for example changing values of pulse width, to which circuits in target 6 would respond, could be used to locate and simultaneously control the target.

It is clear hereinafter that the radar set might be airborne and simultaneously obtain its bearing in relation to a ground station and direct apparatus on the ground; or from the air a ship might be directed to a point appearing on the radar screen.

However, as exemplified herein, it is contemplated that when radar set 5 is operating at the pulse repetition frequency corresponding to position 9A of switch 9 aircraft 6 will fly in a straight course; when in position 9B aircraft 6 will execute a left turn; when in position 9C it will execute a right turn; and when in position 9D it will become responsive to switch position 9E if, and only if, switch 9 is placed in the latter position within a predetermined time after it has been in position 9D. Aircraft 6 will then execute a predetermined maneuver, or apparatus within aircraft 6 may be designed to come into operation at that time. In other words, apparatus at a distance may be caused to respond to different pulse repetition frequencies transmitted by radar set 5.

Figure 2:
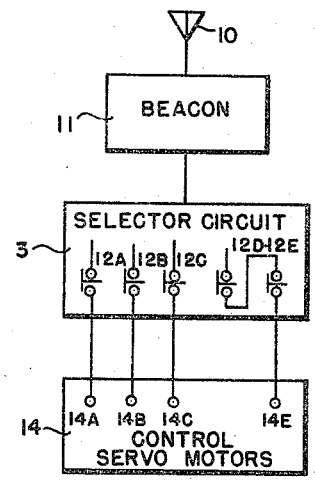
Fig. 2 is a diagram illustrating the manner in which certain relays may control the flight of an aircraft.

Referring now to Fig. 2 there is illustrated diagrammatically circuits contemplated for use within aircraft 6. A non-directional antenna 10 receives the impulses of radio energy transmitted from antenna 7. These impulses are fed to a beacon apparatus 11 which, after a slight constant time delay, transmits a pulse or pulses of radio frequency energy through antenna 10. As an example of beacon apparatus, reference may be made to the copending application of Erwin R. Gaerttner filed April 3, 1945, Serial No. 586,421, now Patent No. 2,543,454, granted February 27, 1951, and dealing with an improvement in such beacons. As a preferred mode of operation, the carrier frequency of transmission of the response beacon 11 is of a different frequency from the carrier frequency of the interrogating pulses or radio frequency pulses of energy from antenna 7. The receiver of radar set 5, which may utilize the same antenna 7 as the transmitter of radar 5 is tuned to the responding carrier frequency of beacon 11. It will be apparent to those skilled in the radio art that by using different carrier frequencies, errors which might be caused by returning echoes from ground objects and neighboring aircraft are obviated. The use of beacon 11 is recommended also because it returns a stronger signal than can be procured simply by reflection of energy to antenna 7. However, reflected pulses could be used. The pulse repetition of radio frequency energy from beacon 11 is the same as that of transmission from radar set 5 when one pulse is returned by the beacon for each interrogating pulse. Simple reflected pulses, or those returned by the beacon 11, are thus synchronized to the original pulses, and may be used for target tracking.

Figure 3:
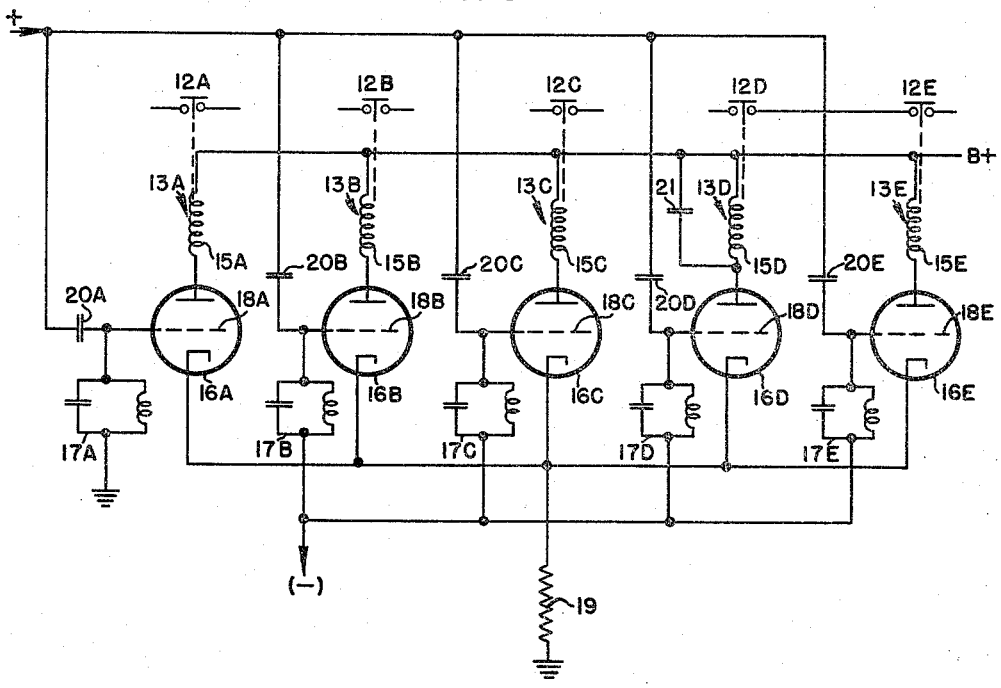
Fig. 3 is one of the circuits indicated in Fig. 2, illustrating the best mode contemplated of practicing the invention in conjunction with the components diagrammatically illustrated in Figs. 1 and 2.

A portion of the interrogating signal after demodulation, and if desired, amplification in the target, may be forwarded to selector circuit 3 which is shown in greater detail in Fig. 3. Therefore, the input to selector circuit 3 consists of a signal which possesses frequency components dependent upon the pulse repetition frequency under which radar set 5 is operated. Accordingly, the frequncies of input to selector circuit 3 are controlled by the position of control switch 9. Selector circuit 3 includes contacts 12A, 12B, 12C, 12D and 12E (diagrammed in Fig. 2) of relays 13A, 13B, 13C, 13D, and 13E of Fig. 3 respectively. Contacts 12A to 12C may serve to lead power to contacts 14A to 14C of Fig. 2 respectively of the aircraft control servomotors or servo-mechanisms which are thereby made operative to cause the aircraft to fly straight, make a left turn, or a right turn respectively. Contacts 12D and 12E are connected in series and may provide a source of power when closed to terminal 12 of control motors 14 or otherwise make them operable to cause the aircraft to drop a bomb load or execute some other maneuver. If relay contacts 12D and 12E are connected in series, before the mechanism made operable by applying power to terminal 14E is effective, it is necessary that both sets of relay contacts 12D and 12E are closed simultaneously.

Referring now to Fig. 3, there is indicated in detail selector circuit 3. Current operated coils 15A to 15E of relays 13A to 13E respectively are connected in the plate to cathode circuits of vacuum tubes 16A to 16E respectively. Tuned circuits 17A to 17E inclusive are connected in the grid to cathode circuit of each of said vacuum tubes respectively. Negative bias is supplied to each of grids 18B to 18E of vacuum tubes 16B to 16E respectively through respective tuned circuits 17B to 17E. However, tuned circuit 17A has no bias supplied thereto, the circuit to cathode of 16A leading through resistance 19, which serves as a common cathode resistor for all of tubes 16A to 16E inclusive. The purpose of common cathode resistor 19 and the manner chosen for biasing the various tubes will be more fully apparent hereinafter. The pulse repetition frequency from beacon 11 may be introduced through suitable condensers, 20A to 20E, as signals to grids 18A to 18E inclusive. A suitable power source (not shown) may supply plate voltage through coils 15A to 15E inclusive. Circuits 17A to 17E inclusive are tuned to the respective pulse repetition frequencies associated with positions 9A to 9E inclusive of control switch 9 in Fig. 1. It is preferable that none of the pulse repetition frequencies be integral multiples of any other.

In explanation of the circuit operation, assume that it is desired to direct aircraft 6 in straight line flight. Switch 9 may be placed in position 9A whereupon radar set 5 transmits a series of pulses repeating at a frequency of 731 P. P. S. Thereupon beacon 11 of Fig. 2 is triggered by each pulse transmitted from antenna 7, and therefore its modulating voltage contains a frequency component of 731 P. P. S. (or multiple thereof) to which circuit 17A is tuned. Part of the beacon modulating voltage is supplied through each of condensers 20A to 20E inclusive to grids 18A to 18E. It is contemplated that tube 16A will normally be sufficiently conductive to operate relay 13A, and the voltage excited in tuned circuit 17A will cyclically raise the voltage of grid 18A so that conduction in tube 16A is at least as great as before pulses were introduced from beacon 11. Therefore, the apparatus with selector circuit 3 as shown will operate to maintain aircraft 6 in straight line flight either during reception at the pulse repetition frequency corresponding to switch 9A of switch 9 when radar set 5 is operating, or when the beacon is triggered at some pulse repetition frequency to which none of circuits 17A to 17E inclusive are tuned, or when radar set 5 is nonoperative. This objective might be achieved by utilizing a normally closed set of contacts series connected to terminal 14A in the other relays 13B to 13E inclusive.

Supposing now that it is desired to cause aircraft 6 to execute a left turn. Switch 9 is placed in position 9B which causes radar set 5 to transmit interrogating pulses at a pulse repetition frequency of 1024 P. P. S. In a manner similar to the operation when switch 9 is in position 9A beacon 11 will supply a frequency component of 1024 P. P. S. to each of grids 18A to 18E inclusive. As circuits 17A, 17C, 17D and 17E are tuned to other frequencies, they will bypass the frequency voltage of 1024 C. P. S. However, circuit 17B is tuned to this frequency and therefore tube 16B will now become conductive at least on high voltage peaks of grid 18B. The circuit may be designed so that tube 16B becomes sufficiently conductive, not only to cause response of relay 13B, closing contacts 12B, but also to cause a sufficient voltage drop across resistance 19 to cut off tube 16A. Contacts 12A are thereby opened as contacts 12B are closed causing aircraft 6 to execute a left turn. From the diagrammed circuit of Fig. 3 it is apparent that to cause aircraft 6 to execute a right turn, switch 9 may be placed in position 9C whereupon contacts 12C of relay 13C will close and the other relays will open or remain open. In this regard the operation of the circuit is not materially different from its operation when it is desired to cause aircraft 6 to execute a left turn, except that the pulse repetition frequency of transmission is different.

Suppose that it is desired to actuate a bomb release mechanism or some other type of mechanism in aircraft 6 which will become operative when terminal 14E of Fig. 2 receives power. In particular, it may be desirable to prevent operation of a bomb release mechanism through any accidental means such as might occur if beacon 11 is tripped by accidental transmission at a pulse repetition frequency including frequency components to which circuits 17D and 17E are tuned. Therefore, relay contacts 12D and 12E are connected in series. Furthermore, it is contemplated that when relay 13D is actuated, it will cause contacts 12D to remain closed for a predetermined period of time, say five seconds. This can be accomplished by placing a capacitance, such as condenser 21, in parallel with coil 15D of relay 13D. It may be presumed that relay 13D responds to a small current flow so that coil 15D may be of fine wire closely wound, that is, a high resistance coil. Therefore the parallel coil condenser combination of coil 15D and condenser 21 may be so heavily loaded with resistance that insofar as a voltage maintained across 15D is concerned the circuit will behave as a resistor-condenser combination with a comparatively high time constant. Thus, tube current through tube 16D passing through coil 15D builds up a voltage across the coil and charges condenser 21 at the same time. After current flow through 16D has ceased, the charge on the condenser maintains a sufficient voltage across coil 15D by virtue of the above described high time constant to keep contacts 12D closed for a predetermined period of time thereafter. Therefore, if it is desired to cause aircraft 6 to execute the operation which servo mechanisms 14 will perform when both sets of relay contacts 12D and 12E are closed at the same time, it is necessary to first operate radar set 5 at the pulse repetition frequency rate corresponding to switch position 9D, and within a predetermined time thereafter place switch 9 in position 9E. This means provides a coding device, as it is extremely unlikely that any accident, or even design, except a purpose arising from knowledge, would result in beacon 11 being triggered first at a pulse repetition rate corresponding to the tuned frequency of circuit 17D, and subsequently, within a predetermined time thereafter (which could be made exceedingly short) being triggered at a pulse repetition frequency which would correspond to tuned frequency of circuit 17E. It is also clear that the reverse order would not suffice since relay 12E will remain closed only so long as tube 16E is conductive.

It will be apparent to those skilled in the art that there are many variations of the invention without departing from its scope and spirit. Such variations might not only appear in the various element combinations, but in specific elements such as selector circuit 3. Therefore, it is not desired to restrict the invention except as indicated by the accompanying claims.

What is claimed is:

1. A remote control system for controlled stations such as airplanes and the like, comprising a control station including a transmitter of pulses of electromagnetic energy at any of a plurality of pulse repetition rates, means for selecting one of said repetition rates for transmission, a receiver of return pulses, and means for indicating the direction of said return pulses and the time elapsed between a transmitted pulse and a corresponding return pulse; and a controlled station including a receiver of said transmitted pulses, means for generating return pulses of electromagnetic energy of a different carrier frequency than that of said transmitted pulses, said receiver at said controlled station being coupled to said generating means for initiating said return pulses by means of said transmitted pulses received thereby and for synchronizing said return pulses with said transmitted pulses, means for transmitting said return pulses, said receiver at said control station being tuned to the carrier frequency of said return pulses, means for detecting the frequency of the pulse repetition rate of said control station transmitted pulses, and normally inoperative frequency selective circuits for controlling the motions of said controlled station, said detecting means being coupled to said frequency selective circuits for rendering them selectively operative.

2. In a controlled station of a remote control system, a frequency selective arrangement comprising a plurality of thermionic tubes each having a cathode and a grid and a plate, each tube having a plate-to-cathode circuit and a grid-to-cathode circuit, all but one of said tubes having means for biasing said tubes to cut-off, a parallel tuned circuit in each of said grid-to-cathode circuits, each of said tuned circuits being tuned to a different pulse repetition frequency, a common resistance in the grid-to-cathode and the plate-to-cathode circuits of all of said tubes, means for simultaneously applying a signal voltage of a given pulse repetition frequency to all of said grids to overcome the bias of that tube only which has its grid-to-cathode parallel tuned circuit tuned to the repetition frequency of said signal voltage, said one unbiased tube being biased to cut-off by the current through said common resistance when any of the other tubes are conducting, and separate output connections from each of said tubes, for coupling to one of the devices to be controlled at said controlled station, whereby the one of said output connections which is coupled to said one unbiased tube restores a predetermined condition at said controlled station.

3. A selective arrangement according to claim 2, in which said output connections include relays having coils and contacts, at least two of said contacts being connected in series, for coupling to one of the devices to be controlled, and at least one of said coils associated with one of said two contacts having a time constant circuit connected thereto for maintaining said one contact closed for a predetermined period of time after the signal which actuates said one coil and contact has been removed.

4. A remote control system for at least one controlled station, comprising a control station including radio-object location apparatus, and means for selectively enabling said apparatus to transmit electromagnetic energy pulses at any one of a plurality of pulse repetition rates; and at least one controlled station including a plurality of means respectively responsive to one of said plurality of pulse repetition rates for steering said controlled station, thereby enabling said radio-object location apparatus to both track said control station as well as control the movements thereof.

5. A system, according to claim 4, further including a transmitter at said controlled station responsive to and synchronized with the energy pulses transmitted by said control station, said transmitter enabling said radio-object location apparatus to track the controlled station when they are far apart.

References Cited in the file of this patent

UNITED STATES PATENTS

| | | |
|---|---|---|
| 1,444,417 | Hammond, Jr. | Feb. 6, 1923 |
| 1,597,416 | Mirick | Aug. 24, 1926 |
| 1,801,657 | Buyko | Apr. 21, 1931 |
| 1,924,156 | Hart | Aug. 29, 1933 |
| 2,070,900 | Harris | Feb. 16, 1937 |
| 2,134,716 | Gunn | Nov. 1, 1938 |
| 2,165,800 | Koch | July 11, 1939 |
| 2,173,154 | Bernard | Sept. 19, 1939 |
| 2,210,575 | Fitch | Aug. 6, 1940 |
| 2,397,088 | Clay | Mar. 26, 1946 |
| 2,398,411 | Cook | Apr. 16, 1946 |
| 2,427,569 | Nicoloson | Sept. 16, 1947 |
| 2,444,426 | Busignies | July 6, 1948 |
| 2,459,811 | Grieg | Jan. 25, 1949 |
| 2,471,373 | Joyner | May 24, 1949 |
| 2,531,412 | Deloraine | Nov. 28, 1950 |
| 2,542,803 | Evans et al. | Feb. 20, 1951 |
| 2,557,949 | Deloraine | June 26, 1951 |
| 2,580,453 | Murray et al. | Jan. 1, 1952 |
| 2,594,305 | Haller | Apr. 29, 1952 |